Patented Sept. 2, 1924.

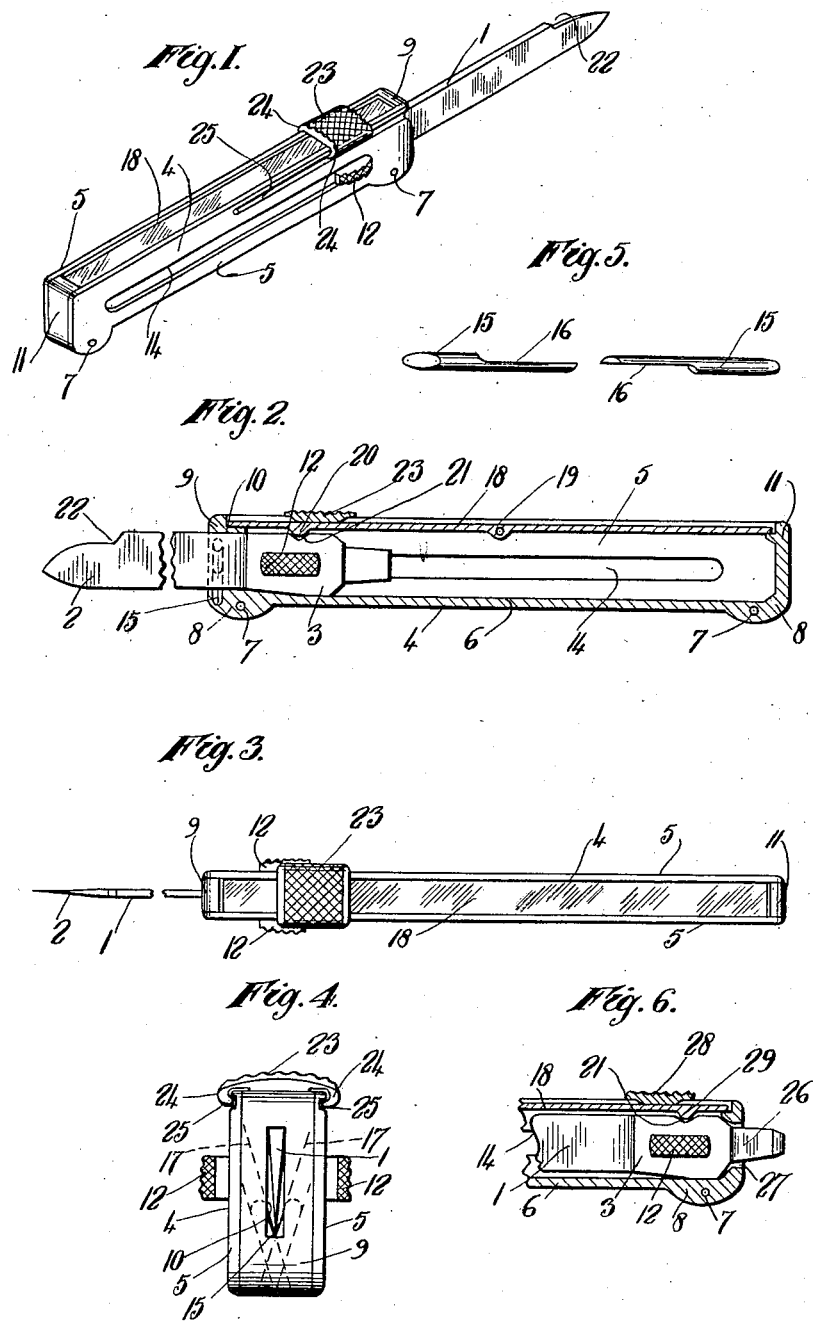

1,507,043

UNITED STATES PATENT OFFICE.

GEORGE EDWIN BLOW, OF STEVENAGE, ENGLAND.

POCKETKNIFE.

Application filed January 15, 1924. Serial No. 686,323.

*To all whom it may concern:*

Be it known that I, GEORGE EDWIN BLOW, subject of the King of Great Britain and Ireland, residing at 87 High Street, Stevenage, in the county of Hertfordshire, England, have invented a new and useful Pocketknife, of which the following is a specification.

This invention relates to improvements in pocket and like knives and has for its object to provide means on the knife whereby the cutting blade or blades will be automatically sharpened so as to maintain a good cutting edge.

According to this invention, the blade or blades are arranged to slide longitudinally in the handle to withdraw the blade for use or to return it to the handle when not required. The sliding movement of the blade or blades is utilized to maintain them in a sharpened condition by causing steels or other sharpening means to engage the cutting edge as they are slidden in or out of the handle. Suitable means are provided to lock the blade or blades in the open or closed position and for this purpose a pivoted bar preferably of springy material may be provided with a projection or projections adapted to be pressed into a recess or recesses in the blade or blades and to be locked therein by a suitable catch or slide. The blade or blades may thus be locked in position for use or will be retained in the handle when not required.

In order that my invention may be more readily understood reference is had to the accompanying sheet of drawings which show an embodiment of my invention as applied to a single blade pocket knife, as an example, and in which:—

Fig. 1 is a perspective view of a pocket knife with the blade withdrawn ready for use.

Fig. 2 is a longitudinal section of the same, and

Fig. 3 is a plan thereof.

Fig. 4 is an end view.

Fig. 5 are details of the two sharpening steels, and

Fig. 6 is a sectional detail showing a modification.

Referring to Figs. 1, 2, 3, 4 and 5, the knife comprises a slidable blade 1 pointed at its forward end 2 and formed with a block 3 adapted to slide in a casing 4. This casing 4 comprises a pair of side plates 5 secured upon opposite sides of a separating strip 6 by means of screws 7 passing through the side plates 5 and lugs 8 at each end of the separating strip 6. The forward end of this separating strip 6 is provided with a filling block 9 slotted at 10 to permit the knife blade 1 to slide through it. The rear end of the strip 6 is provided with an end block 11 to close the end of the casing and form an abutment against which the blade block engages when the knife blade is drawn into the casing.

The blade block 3 is provided with a pair of finger pieces 12 which project through slots 14 in the side plates 5 and are provided with roughened surfaces so as to permit them to be readily gripped between the finger and thumb to enable the blade block 3 to be moved longitudinally in the casing 4 so as to withdraw or return the knife blade from or into the casing as required.

In the filling block 9 at the forward end of the strip 6 are located a pair of sharpening steels 15 (shown in detail in Fig. 5) and which are provided with cutting edges 16 as shown. These sharpening steels 15 are located in holes 17 drilled at an angle in the filling block 9 as shown in Fig. 4 so that the steels 15 cross close to the cutting edge of the knife blade 1. In the back of the casing 4 is located a springy strip 18 pivoted to the side plates at 19 and extending along the length of the casing so as to fill the space between the side plates 5 and the filling block 9 and end plate 11. This springy strip 18 is provided with a projecting knob 20 near its forward end which resiliently presses upon the back of the knife blade 1, and so resiliently urges its cutting edge 1 toward the sharpening steels 15. When therefore the knife blade 1 is withdrawn or returned to the casing the cutting edges 16 of the sharpening steels 15 will act upon the knife blade to keep it sharp and in good condition for use.

In order to lock the blade block 3 and the knife blade 1 in the open or closed position, a recess 21 is formed in the blade block 3 and a second recess 22 in the back of the blade near its forward end. A slide 23 is mounted on the casing 4 by means of turned over edges 24 which engage in grooves 25 in the side plates 5. When this slide 23 is moved toward the forward end of the casing 4 it will act to lock the projecting knob 20 in the recess 21 in the blade block 3 when the knife blade is withdrawn as shown in Fig. 2. If however the blade 1 is drawn into the casing then the projecting knob 20 will engage in the recess 22 in the back of the blade 1 and upon moving the slide to the forward end of the casing it will be locked therein so as to prevent accidental withdrawal of the knife blade.

Referring now to Fig. 6 this shows a slight modification in which the blade block 3 is provided with a screwdriver end 26 which may be made to project through a slot 27 formed in the end plate 11 if the blade block is moved from its normal closed position toward this end plate 11, and in an opposite direction to the movement required to withdraw the knife blade 1 from the forward end of the casing 4. A second locking slide 28 is then provided to lock the blade block 3 in this position by holding a projecting knob 29 on the rear end of the springy strip 18 in the recess 21 on the blade block. This projection 29 will also act to prevent the screwdriver end 26 from being pushed out through the end of the casing 4 when returning the knife blade to the casing after use. This will be effected if the slide 28 is retained at the rear end of the casing when it will hold the projecting knob 29 in a position to engage the end of the blade block when it is moved to return the knife blade after use.

I claim:—

1. In a pocket knife, a casing, at least one blade slidably mounted therein, sharpening means arranged at the end of the casing to operate on the cutting edge of the blade, spring means to hold the cutting edge of the blade in engagement with the sharpening means and a locking device for securing the blade in the open or closed position.

2. In a pocket knife, a casing comprising a pair of side plates and a separating strip whose ends are apertured to slidably receive blades, at least one blade slidably mounted therein, sharpening means arranged at the end of the casing to operate on the cutting edge of the blade, spring means to hold the cutting edge of the blade in engagement with the sharpening means and a locking device for securing the blade in the open or closed position.

3. In a pocket knife, a casing, a blade holder mounted to slide in the casing, finger pieces projecting through slots therein, at least one blade attached to the blade holder, sharpening means arranged at the end of the casing to operate on the cutting edge of the blade, spring means to hold the cutting edge of the blade in engagement with the sharpening means and a locking device for securing the blade in the open or closed position.

4. In a pocket knife, a casing comprising a pair of side plates and a separating strip whose ends are apertured to slidably receive blades, a blade holder mounted to slide in the casing, finger pieces projecting through slots therein, at least one blade attached to the blade holder, sharpening means arranged at the end of the casing to operate on the cutting edge of the blade, spring means to hold the cutting edge of the blade in engagement with the sharpening means and a locking device for securing the blade in the open or closed position.

5. In a pocket knife, a casing comprising a pair of side plates and a separating strip whose ends are apertured to slidably receive blades, at least one blade slidably mounted therein, sharpening means arranged at the end of the casing to operate on the cutting edge of the blade, a spring strip along the back of the casing, to hold the cutting edge of the blade in engagement with the sharpening means, projections on the spring strip adapted to engage recesses in the blade and at least one slide on the casing to lock these projections therein for securing the blade in the open or closed position.

6. In a pocket knife, a casing comprising a pair of side plates and a separating strip whose ends are apertured to slidably receive blades, a blade holder mounted to slide in the casing, finger pieces projecting through slots therein, at least one blade attached to the blade holder, sharpening means arranged at the end of the casing to operate on the cutting edge of the blade, a spring strip along the back of the casing to hold the cutting edge of the blade in engagement with the sharpening means, projections on the spring strip adapted to engage recesses in the blade and at least one slide on the casing to lock these projections therein for securing the blade in the open or closed position.

7. In a pocket knife, a casing, at least one blade slidably mounted therein, sharpening means comprising a pair of steels set at an angle and arranged at the end of the casing to operate on the cutting edge of the blade, spring means to hold the cutting edge of the blade in engagement with the sharpening means and a locking device for securing the blade in the open or closed position.

8. In a pocket knife, a casing comprising a pair of side plates and a separating strip whose ends are apertured to slidably receive blades, a blade holder to slide in the casing, finger pieces projecting through slots therein, at least one blade attached to the blade holder, sharpening means comprising a pair of steels set at an angle and arranged at the end of the casing to operate on the cutting edge of the blade, spring means to hold the cutting edge of the blade in engagement with the sharpening means and a locking device for securing the blade in the open or closed position.

9. In a pocket knife, a casing comprising a pair of side plates and a separating strip whose ends are apertured to slidably receive blades, a blade holder mounted to slide in the casing, finger pieces projecting through slots therein, at least one blade attached to the blade holder, sharpening means comprising a pair of steels set at an angle and arranged at the end of the casing to operate on the cutting edge of the blade, a spring strip along the back of the casing to hold the cutting edge of the blade in engagement with the sharpening means, projections on the spring strip adapted to engage recesses in the blade and at least one slide on the casing to lock these projections therein for securing the blade in the open or closed position.

10. In a pocket knife, a casing comprising a pair of slotted side plates, a separating strip between the side plates, end blocks to this strip apertured to permit a knife blade to pass therethrough, a blade block adapted to slide in the casing, finger pieces on each side of the blade block and which project through the slots in the side plates, a blade at one end of the blade block adapted to slide through the aperture in one end block, a pair of steels arranged at an angle in this end block one one each side of the blade, a spring strip along the back of the casing which presses the blade between the sharpening steels, a projection on this strip adapted to engage recesses in the blade and the blade block, and a slide on the casing adapted to hold the projections on the spring strip in either recess in the blade or blade block.

11. In a pocket knife, a casing comprising a pair of slotted side plates, a separating strip between the side plates, end blocks to this strip apertured to permit a knife blade to pass therethrough, a blade block adapted to slide in the casing, finger pieces on each side of the blade block, and which project through the slots in the side plates, a blade at one end of the blade block adapted to slide through the aperture in one end block, a pair of steels arranged at an angle in this end block one on each side of the blade, a spring strip along the back of the casing which presses the blade between the sharpening steels, projections on this strip adapted to engage recesses in the blade and the blade block, a second blade on the other end of the blade block and a pair of slides to hold projections on the spring strip in recesses in the blades or blade block.

GEORGE EDWIN BLOW.